United States Patent [19]

Kurosawa et al.

[11] Patent Number: 4,928,281

[45] Date of Patent: May 22, 1990

[54] SEMICONDUCTOR MEMORY

[75] Inventors: Hinoko Kurosawa, Hino; Kazuya Itoh, Kodaira; Hisashi Nakamura, Ohme; Masamichi Ishihara, Hinode, all of Japan

[73] Assignee: Hitachi, Ltd., Tokyo, Japan

[21] Appl. No.: 60,331

[22] Filed: Jun. 10, 1987

[30] Foreign Application Priority Data

Jun. 13, 1986 [JP] Japan ................................ 61-135915

[51] Int. Cl.$^5$ ............................................. G06F 11/10
[52] U.S. Cl. .................................................. 371/51.1
[58] Field of Search ................. 371/49, 51, 38, 49.1, 371/51.1

[56] References Cited

U.S. PATENT DOCUMENTS

| | | | |
|---|---|---|---|
| 3,245,040 | 4/1966 | Burdette et al. | 371/51 |
| 3,789,204 | 1/1974 | Barlow | 371/51 |
| 4,016,409 | 4/1977 | Kim | 371/51 |
| 4,295,219 | 10/1981 | Draper et al. | 371/51 |
| 4,472,805 | 9/1984 | Wacyk et al. | 371/51 |
| 4,514,847 | 4/1985 | Tateishi et al. | 371/51 |
| 4,528,666 | 7/1985 | Cline et al. | 371/51 |
| 4,596,015 | 6/1986 | Clements et al. | 371/51 |
| 4,627,059 | 12/1986 | Bronold | 371/51 |
| 4,692,893 | 9/1987 | Casper | 364/900 |
| 4,740,971 | 4/1988 | Tam et al. | 371/51 X |

*Primary Examiner*—Charles E. Atkinson
*Attorney, Agent, or Firm*—Antonelli, Terry & Wands

[57] ABSTRACT

A semiconductor memory includes a memory array which outputs storage data, at least one data unit at a time, each data unit having a plurality of bits including a parity bit, a parity check circuit for performing a parity check on storage data, at least one data unit at a time, input for both to and output from the memory array, and an external terminal for outputting the result of the parity check.

13 Claims, 6 Drawing Sheets

SEMICONDUCTOR MEMORY

BACKGROUND OF THE INVENTION

The present invention relates to a semiconductor memory and, more particularly, to a technique which may effectively be applied to, for example, a static type RAM (Random-Access Memory) that is accessed with data consisting of a plurality of bits.

A variety of semiconductor memories such as a static RAM that is accessed with data consisting of a plurality of bits, e.g., in units of bytes, are described, for example, in "Hitachi IC Memory Data Book", Hitachi Ltd., September 1983, pp. 226 to 232.

Conventional semiconductor memories of the type described above have relatively small storage capacities which are prepared in the form of individual memory integrated circuits and incorporate no error detecting circuits such as ones adapted for performing parity check.

A memory system which requires a relatively large storage capacity is realized by combining together a plurality of semiconductor memories. In the case where a memory system needs to have an error detecting function such as a parity check function, it is conventional practice to provide a predetermined parity check circuit in the memory system or execute processing of a program for parity check in a processing unit.

SUMMARY OF THE INVENTION

However, as the capacity of semiconductor memories progressively increases with the advancement of technology for achieving microfabrication and high integration of semiconductor integrated circuits, the following problems have arisen:

(1) As circuit element of semiconductor memories are reduced in size by miniaturization, the incidence of soft errors due to radioactive rays, for example, α-rays, becomes higher.

(2) Since each individual memory integrated circuit has no error detecting function despite the fact that the memory capacity of semiconductor memories is progressively increased, it is necessary to provide a common circuit such as an error detecting circuit which comprises discrete components, and this makes it difficult to simplify the arrangement of memory systems as desired.

(3) For the reason that has been stated in (2), a precise diagnosis cannot be made, which means that it is impossible to satisfactorily improve the reliability of memory systems.

In these circumstances, it is necessary to prepare semiconductor memories having a certain error detecting function to thereby simplify the arrangement of memory systems as well as improve the reliability.

It is an object of the present invention to provide a semiconductor memory having a parity check function.

It is another object of the present invention to achieve simplification of memory systems and improvement in reliability thereof.

The above and other objects and novel features of the present invention will become clear from the following description taken in conjunction with the accompanying drawings.

A representative one of the novel techniques disclosed in this application will briefly be described below.

Namely, each individual semiconductor memory such as a static type RAM is arranged so as to incorporate a parity check circuit adapted for performing parity check on input and output data and further provided with a function for inhibiting a write operation when a parity error is detected.

According to the above-described means, it is possible to prevent erroneous writing due to abnormal input data and to simplify the arrangement of a memory system including the semiconductor memory. In addition, it is possible to enhance the diagnostic ability of the system and to thereby improve the reliability thereof.

DESCRIPTION OF THE PREFERRED EMBODIMENTS

[Embodiment 1]

Figure 1:
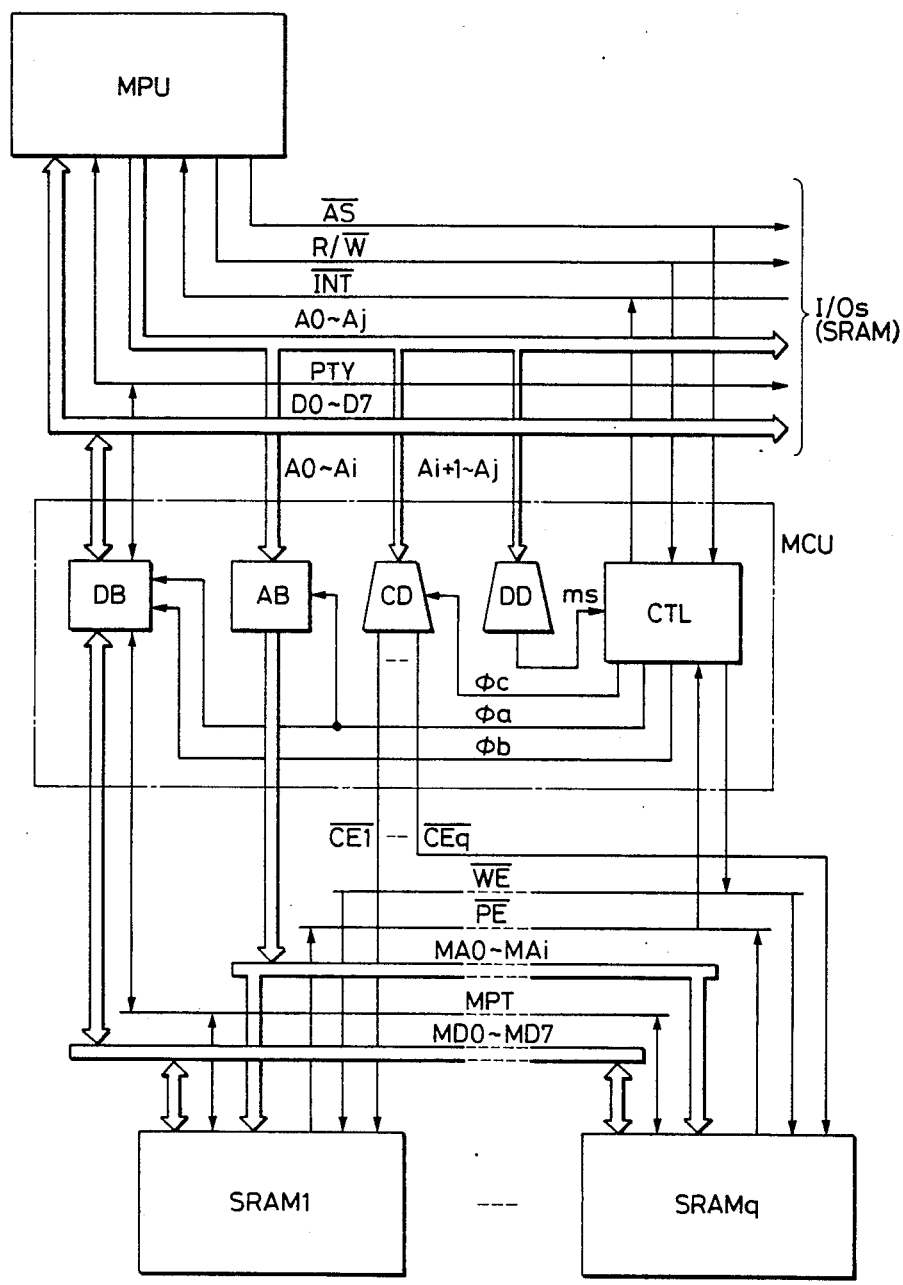
FIG. 1 is a connection diagram of one embodiment of a memory system including static type RAM's to which the present invention is applied.

FIG. 1 is a connection diagram of one embodiment of a memory system including static RAM's to which the present invention is applied.

The memory system in this embodiment is employed as an external memory device of a microcomputer system and connected to system buses of a microprocessor MPU, although not necessarily limited thereto. The memory system includes q static type RAM's (SRAM 1 to SRAMq) and a memory control unit MCU for controlling these static type RAM's. Each static type RAM performs reading and writing of storage data each consist of 9 bits including a parity bit, although not necessarily limited thereto. Each static RAM incorporates a parity check circuit for performing parity check on input and output data. The result of the parity check performed in each static type RAM is sent to the memory control unit MCU through a bus for a parity error signal $\overline{PE}$ among internal control buses. When a parity error is detected in any one of the static type RAM's, the memory control unit MCU requests an interruption through a bus for an interrupt request signal $\overline{INT}$. Thus, a diagnostic processing by the microprocessor MPU is started.

Referring to FIG. 1, the memory control unit MCU is connected to the microprocessor MPU through system buses. The system buses include, although not necessarily limited thereto, address buses A0 to Aj for an address signal consisting of j+1 bits, data buses D0 to D7 and PTY for data consisting of 8 data bits and one parity bit, and control buses for an address strobe signal e,ovs/AS/ , a read/write signal R/$\overline{W}$ and an interrupt request signal $\overline{INT}$. To these system buses are connected a plurality of input/output devices I/O along with the above-described memory control unit MCU. Further, a static RAM (SRAM) having a bus control function may be connected to the system buses as an elemental unit, as described later.

The address signal and data which are transferred through the address and data buses, respectively, are fetched into the memory control unit MCU or the input/output devices in response to the shift of the address strobe signal $\overline{AS}$ to a low level. At this time, in accordance with the level of the read/write signal $R/\overline{W}$, the direction of movement of the data transferred through the data buses is specified. More specifically, when the read/write signal $R/\overline{W}$ is at a low level, the data is transferred from the microprocessor MPU to the memory control unit MCU or the input/output devices I/O. On the other hand, when the read/write signal $R/\overline{W}$ is at a high level, the data is transferred from the memory control unit MCU or the input/output devices I/O to the microprocessor MPU.

The memory control unit MCU and the input/output devices I/O are specified by a device code which is supplied in the form of a combination of some of the higher-order bits of the address signal transferred through the address buses and are thereby selectively brought into an operative state, although not necessarily limited thereto. The q static type RAM's are specified by the remaining higher-order bits of the address signal and are thereby selectively brought into a select state. The lower-order bits of the address signal are transferred so as to serve as a signal for selecting an address in each static type RAM.

As described above, each static type RAM incorporates a parity check circuit. When a parity error is detected in any one of the static type RAM's, the memory control unit MCU shifts the interrupt request signal $\overline{INT}$ to a low level. The other input/output devices I/O similarly have an error detecting function, and when an error is detected, the interrupt request signal $\overline{INT}$ is also shifted to the low level. When the interrupt request signal $\overline{INT}$ is shifted to the low level, the microprocessor MPU suspends normal processings and starts an interruption. When an interruption is started by the microprocessor MPU, the memory control unit MCU and each input/output device I/O return the interrupt request signal $\overline{INT}$ to the high level.

On the other hand, the memory control unit MCU is connected to each other of the static type RAM's through internal buses of the memory system. The internal buses include internal address buses MA0 to Mai for an internal address signal consisting of i+1 bits, internal data buses MD0 to MD7 and MPT for internal data consisting of 9 bits including a parity bit, and internal control buses for a write enable signal $\overline{WE}$ and a parity error signal $\overline{PE}$. Further, the static type RAM's are supplied with corresponding chip enable signals $\overline{CE1}$ to $\overline{CEq}$, respectively, from the memory control unit MCU.

The static type RAM's are selectively brought into a select state in response to the shift of the corresponding chip enable signals $\overline{CE1}$ to $\overline{CEq}$ to a low level. If, at this time, the write enable signal $\overline{WE}$ is at a high level, the selected static type RAM is activated in the read operation mode so as to read data stored at an address specified through the internal address buses and send the read data to the memory control unit MCU. On the other hand, if the write enable signal $\overline{WE}$ is at a low level, the static type RAM is activated in the write operation mode so as to write input data at an address specified through the internal address buses, the input data being supplied through the internal data buses.

Each static type RAM executes the above-described read or write operation with data consisting of 9 bits including a parity bit PTY. As described above, each static type RAM incorporates a parity check circuit. When a particular static type RAM is in the read operation mode, the associated parity check circuit carries out parity check on storage data read out from a specified address. When the static type RAM is in the write operation mode, the parity check circuit carries out parity check on write data supplied through the internal data buses. When a parity error is detected in either one of the operation modes, the static type RAM shifts the parity error signal $\overline{PE}$ to a low level. Although not necessarily limitative, the parity error signals $\overline{PE}$ which are respectively output from the static type RAM's are directly combined together in the form of a wired logical sum (OR). When any one of the parity error signals $\overline{PE}$ is shifted to the low level, the memory control unit MCU shifts the interrupt request signal $\overline{INT}$ to the low level.

Although not necessarily limitative, the memory control unit MCU includes a data buffer DB, an address buffer AB, a chip code decoder CD, a device code decoder DD and a control circuit CTL.

The data buffer DB in the memory control unit MCU is connected at one side thereof to the data buses D0 to D7 and PTY and at the other side to the internal data buses MD0 to MD7 and MPT. Further, the data buffer DB is supplied with timing signals $\phi$a and $\phi$b from the control circuit CTL. The timing signal $\phi$a is formed in accordance with the above-described address strobe signal $\overline{AS}$ when a specified static type RAM is activated in the write operation mode. The timing signal $\phi$b is used when a specified static type RAM is activated in the read operation mode, and is temporarily raised to a high level at the time when storage data read out from the static type RAM is established on the internal data buses. When the timing signal $\phi$a is raised to the high level, the data buffer DB fetches and holds write data which is supplied from the microprocessor MPU through the data buses D0 to D7 and PTY. The fetched write data is further transferred to each static type RAM through the internal data buses MD0 to MD7 and MPT. On the other hand, when the timing signal $\phi$b is raised to a high level, the data buffer DB fetches and holds read data which is output from a specified static type RAM through the internal data buses MD0 to MD7 and MPT. The read data is further transferred to the microprocessor MPU through the data buses D0 to D7 and PTY.

The address buffer AB in the memory control unit MCU is connected at one side thereof to the lower-order address buses A0 to Ai and the other side to the internal address buses MA0 to MAi. Further, the address buffer AB is supplied with the above-described timing signal $\phi$a from the control circuit CTL. The address buffer AB fetches and holds the lower-order bits of the address signal which are supplied from the microprocessor MPU through the address buses A0 to Ai at the time the timing signal $\phi$a is raised to the high level when a specified static type RAM is in either the read or write operation mode. The fetched address signal bits are further transmitted to each static type RAM through the internal address buses MA0 to MAi.

The chip code decoder CD in the memory control unit MCU is supplied with a chip code which is transferred from the microprocessor MPU through some of the higher-order address buses Ai+1 to Aj. Further, a timing signal $\phi c$ is supplied to the chip code decoder CD from the control circuit CTL. The timing signal $\phi c$ is raised to a high level and maintained at said level for a predetermined period of time when the memory system is in a select state. When the timing signal $\phi c$ is raised to the high level, the chip code decoder CD is selectively brought into an operative state. In this operative state, the chip code decoder CD decodes a chip code supplied from the microprocessor MPU to selectively shift the chip enable signals $\overline{CE1}$ to $\overline{CEq}$ to the low level.

The device code decoder DD in the memory control unit MCU is supplied with a device code which is transferred from the microprocessor MPU through the remaining ones of the higher-order address buses Ai+1 to Aj. Specific device codes have been given to the memory control unit MCU and the input/output devices I/O, respectively, in advance. When the device code bits are combined in a predetermined form which is given to the memory system, the device code decoder DD raises a memory select signal ms to a high level. The memory select signal ms is supplied to the control circuit CTL.

The control circuit CTL in the memory control unit MCU is supplied with the above-described address strobe signal $\overline{AS}$ and read/write signal $R/\overline{W}$ from the microprocessor MPU through the corresponding control buses. The control circuit CTL is further supplied with the parity error signal $\overline{PE}$ from each static type RAM through the corresponding internal control bus. Further, the control circuit CTL is supplied with the above-described memory select signal ms from the device code decoder DD. The control circuit CTL forms the timing signal $\phi a$ in accordance with the address strobe signal $\overline{AS}$ and supplies it to the address buffer AB. This timing signal $\phi a$ is also supplied to the data buffer DB when a specified static type RAM is set in the write operation mode. The control circuit CTL forms the timing signal $\phi c$ having a predetermined pulse width slightly after the generation of the above-described timing signal $\phi a$, and supplies it to the chip code decoder CD. When a specified static type RAM is set in the read operation mode, the control circuit CTL forms the timing signal $\phi b$ after the generation of the above-described timing signal $\phi c$, and supplies it to the data buffer DB. When the static type RAM is set in the write operation mode, the control circuit CTL temporarily shifts the write enable signal $\overline{WE}$ to the low level at the approximately median point in the period during which the above-described timing signal $\phi c$ is maintained at the high level. When a parity error is detected in any one of the static type RAM's and the parity error signal $\overline{PE}$ therefrom is consequently shifted to the low level, the control circuit CTL shifts the interrupt request signal $\overline{INT}$ to the low level. The control circuit CTL includes a plurality of control flip-flop circuits and time setting circuits which are required to form the above-described various timing signals.

Figure 2:
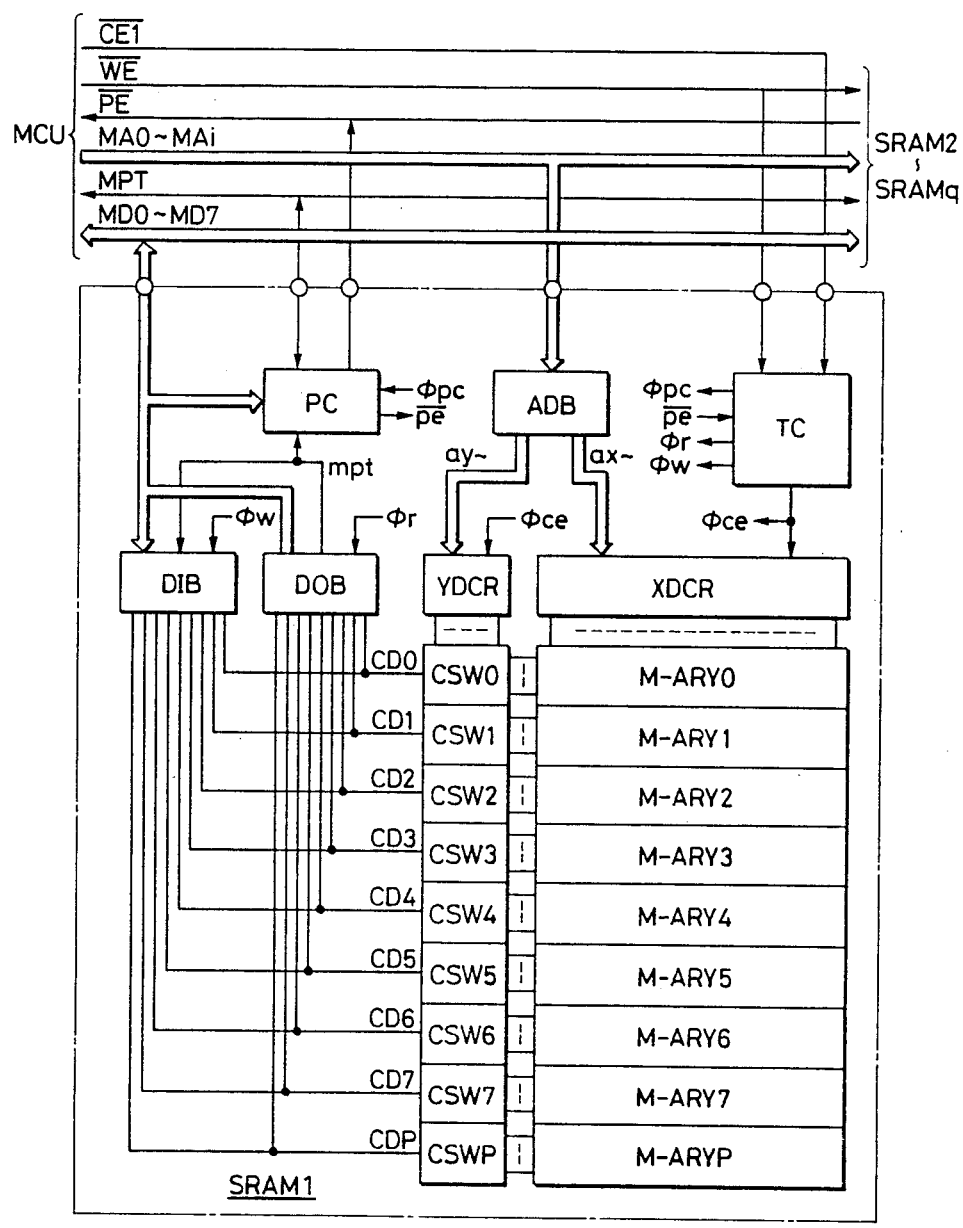
FIG. 2 is a block diagram of one example of the static RAM's shown in FIG. 1.

FIG. 2 is a block diagram of one example of the static type RAM's included in the memory system shown in FIG. 1. The figure is a block diagram exemplarily showing the first static type RAM (SRAM1) among the q static type RAM's included in the memory system in accordance with this embodiment. The other static type RAM's (SRAM 2 to SRAMq) have an arrangement similar to that shown in FIG. 2. Circuit elements which constitute circuit blocks, respectively, of the static type RAM shown in FIG. 2 are fabricated on a single semiconductor substrate defined by, for example, single crystal silicon, using a known semiconductor integrated circuit manufacturing technique.

The static type RAM in accordance with this embodiment performs a read or write operation with storage data consisting 9 bits including a parity bit MPT. The storage data is input and output through the same external terminal. As described above, the static type RAM in accordance with this embodiment incorporates a parity check circuit PC. Although not necessarily limitative, the odd parity check system is employed in this embodiment. More specifically, the level of the parity bit MPT is selectively determined to be the logic "1" or the logic "0" so that the number of "1" bits in each storage data consisting of 9 bits including 8 input/output data bits MD0 to MD7 is expected to be odd. Each of the storage data is monitored by the parity check circuit PC to perform parity check. When a parity error is detected by the parity check circuit PC, an inverted internal parity error signal $\overline{pe}$ is supplied from the circuit PC to the timing control circuit TC. The timing control circuit TC forms a parity error signal /PE/ in response to the shift of the inverted internal parity error signal $\overline{pe}$ to a low level. The parity error signal $\overline{PE}$ is transferred to the memory control unit MCU, and the interrupt request signal $\overline{INT}$ is further formed therein. If a parity error is detected when the static type RAM is set in the write operation mode, the timing control circuit TC does not form a timing signal $\phi w$ for writing (described later). Thus, it is possible to prevent erroneous writing due to abnormal input data.

Referring to FIG. 2, the static type RAM is provided with memory arrays M-ARY0 to M-ARY7 in correspondence with the 8 input/output data bits MD0 to MD7, respectively, and a memory array M-ARVP is provided in correspondence with the parity bit MPT. Each of the memory arrays is composed of a plurality of word lines arranged so as to extend vertically as viewed in FIG. 2, a plurality of pairs of complementary data lines arranged so as to extend horizontally, and a plurality of memory cells which are respectively disposed at the intersections between the word and complementary data lines in such a manner that the memory cells are arranged in a matrix.

The word lines constituting each of the memory arrays M-ARY0 to M-ARY7 and M-ARYP are mutually connected to an X-address decoder XDCR and selectively brought into a select state which is defined by a high level.

The X-address decode XDCR is supplied with a plurality of complementary internal address signals ax~ from an address buffer ADB (described later). Although not necessarily limitative, the complementary internal address signals ax~ are formed on the basis of a plurality of higher-order bits in those of the address signal which are supplied from the memory control unit MCU through the internal address buses MA0 to Mai. Further, the X-address decoder XDCR is supplied with a timing signal $\phi ce$ from a timing control circuit TC. This timing signal $\phi ce$ is formed on the basis of the chip enable signal $\overline{CE}$.

The X-address decoder XDCR is selectively brought into an operative state in response to the timing signal $\phi ce$. The X-address decoder XDCR, when in the operative state, decodes the above-described complementary internal address signals ax~ to form a word line select signal for selectively bringing into a select state one word line which is specified by these address signals. The word line select signal is mutually supplied to the above-described memory arrays M-ARY0 to M-ARY7 and M-ARYP.

The complementary data lines which constitute each of the memory arrays M-ARY0 to M-ARY7 and M-ARYP are respectively connected to corresponding switching MOSFET's in the corresponding column switches CSW0 to CSW7 and CSWP. The switching MOSFET's in each of the column switches CSW0 to CSW7 and CSWP are respectively supplied with corresponding data line select signals from a Y-address decoder YDCR. Thus, the column switches CSW0 to CSW7 and CSWP are adapted to selectively connect pairs of complementary data lines specified in the memory arrays M-ARY0 to M-ARY7 and M-ARYP to corresponding common data lines CD0 to CD7 and CDP, respectively.

The Y-address decoder YDCR is supplied with complementary internal address signals ay~ from the above-described address buffer ADB. Further, the timing signal $\phi$ce is supplied to the Y-address decoder YDCR from the timing control circuit TC. The complementary internal address signals ay~ are formed on the basis of a plurality of lower-order bits in those of the address signal which are supplied from the memory control unit MCU through the internal address buses MA0 to MAi.

The Y-address decoder YDCR is selectively brought into an operative state in response to the timing signal $\phi$ce. The Y-address decoder YDCR, when in the operative state, decodes the complementary internal address signals ay supplied from the address buffer ADB and forms data line select signals for selecting pairs of complementary data lines specified by these address signals. The data line select signals are mutually supplied to corresponding switching MOSFET's in each of the column switches CSW0 to CSW7 and CSWP.

The address buffer ADB receives and holds address signals which are supplied thereto from the microprocessor MPU through the address buses A0 to Ai, the memory control unit MCU and the internal address buses MA0 to MAi. The address buffer ADB further forms the above-described complementary internal address signals ax~ and ay~, which are constituted by in-phase and anti-phase internal address signals, on the basis of the received address signals, and supplies them to the X-address decoder XDCR and the Y-address decoder YDCR, respectively.

By selecting operation conducted by the X-address decoder XDCR, the Y-address decoder YDCR and the column switches CSW0 to CSW7 and CSWP, 9 memory cells which are specified by the address signals MA0 to MAi are simultaneously selected in the memory arrays M-ARY0 to M-ARY7 and M-ARYP and connected to the complementary common data lines CD0 to CD7 and CDP, respectively.

The complementary common data lines CD0 to CD7 and CDP are respectively connected to output terminals for the corresponding bits of a data input buffer DIB and further respectively connected to input terminals for the corresponding bits of a data output buffer DOB. The input terminals for the respective bits of the data input buffer DIB and the output terminals for the respective bits of the data output buffer DOB are connected to the corresponding internal data buses MD0 to MD7 and MDP, respectively. The data input buffer DIB and the data output buffer DOB are respectively supplied with timing signals $\phi$w and $\phi$r from the timing control circuit TC. The timing signal $\phi$w is, when the static type RAM is set in the write operation mode, temporarily raised to a high level in synchronism with the above-described write enable signal $\overline{WE}$. As described above, when a parity error is detected in write data, no timing signal $\phi$w is formed even in the write operation mode. The timing signal $\phi$r is, when the static type RAM is set in the read operation mode, raised to a high level slightly after the generation of the above-described timing signal $\phi$ce.

The data input buffer DIB is selectively brought into an operative state in response to the shift of the timing signal $\phi$w to the high level. The data input buffer DIB, when in the operative state, forms 9-bit write data into complementary write signals, the write data being supplied through the internal data buses MD0 to MD7 and MPT, and writes the write signals into memory cells selected through the corresponding complementary common data lines CD0 to CD7 and CDP. When the timing signal $\phi$w is shifted to the low level, the output of the data input buffer DIB is brought into a high-impedance state.

The data output buffer DOB is selectively brought into an operative state in response the shift of the timing signal $\phi$r to the high level. The data output buffer DOB, when in the operative state, amplifies a read signal which is output from selected memory cells in the memory arrays M-ARY0 to M-ARY7 and M-ARYP through the corresponding common data lines CD0 to CD7 and CDP, and delivers the read signal to the internal data buses MD0 to MD7 and MPT as read data. When the timing signal $\phi$r is shifted to the low level, the output of the data output buffer DOB is brought into a high-impedance state.

The timing control circuit TC is supplied with the above-described write enable signal $\overline{WE}$ and the corresponding chip enable signal $\overline{CE1}$ from the memory control unit MCU. Further, the inverted internal parity error signal $\overline{pe}$ is supplied to the timing control circuit TC from the parity check circuit PC. This inverted internal parity error signal $\overline{pe}$ is normally at the high level and selectively shifted to the low level when a parity error is detected in the parity check circuit PC.

The timing control circuit TC forms the timing signal $\phi$ce on the basis of the above-described chip enable signal $\overline{CE1}$ and supplies it to the X-address decoder XDCR and the Y-address decoder YDCR. In addition, when a select operation in each address decoder is completed, the timing control circuit TC selectively forms the timing signal $\phi$w or $\phi$r in accordance with the level of the write enable signal $\overline{WE}$ and supplies it to the data input buffer DIB or the data output buffer DOB. More specifically, when the static type RAM is set in the write operation mode and the write enable signal $\overline{WE}$ is consequently shifted to the low level, the timing control circuit TC temporarily raises the timing signal $\phi$w to the high level and holds it at said level for a predetermined period of time. When the static type RAM is set in the read operation mode and the write enable signal $\overline{WE}$ is consequently raised to the high level, the timing control circuit TC raises the timing signal $\phi$r to the high level.

The timing control circuit TC further forms the timing signal $\phi$pc for parity check and supplies it to the parity check circuit PC. This timing signal $\phi$pc is, when the static type RAM is set in the write operation mode, raised to the high level before a write operation is started. Further, the timing signal $\phi pc$ is, when the static type RAM is set in the read operation mode, raised to the high level when a read signal constituted by data bits respectively output from selected memory cells is established by the data output buffer DOB.

The parity check circuit PC includes a parity check tree for monitoring write and read data transferred through the internal data buses MD0 to MD7 and MPT, and a flip-flop FPE for displaying the result of parity check, as described later. The flip-flop FPE is supplied with the above-described timing signal $\phi pc$ as a trigger signal.

The parity check circuit PC performs parity check on write and read data transferred through the internal data buses MD0 to MD7 and MPT. In this embodiment, the odd parity check system is employed as described above. The result of parity check is judged at the time the timing signal $\phi pc$ is raised to the high level, and the flip-flop FPE is selectively set. More specifically, when the static type RAM is set in the write operation mode, the timing signal $\phi pc$ is raised to the high level at the beginning of the start of the operation of the static type RAM. If, at this time, the number of "1" bits included in write data is even, the parity is judged to be abnormal, and the flip-flop FPE is thus set. On the other hand, when the static type RAM is set in the read operation mode, the timing signal $\phi pc$ is raised to the high level at the time when a read signal consisting of data bits respectively output from selected memory cells is established by the data output buffer DOB. If, at this time, the number of "1" bits included in the read data is even, the parity is judged to be abnormal, and the flip-flop FPE is thus set. The signal output from the flip-flop FRE is sent to the memory control nit MCU as a parity error signal $\overline{PE}$. Further, the output signal of the flip-flop FPE is sent to the timing control circuit TC as an inverted internal parity error signal $\overline{pe}$. Thus, the above-described writing timing signal $\phi w$ is selectively formed.

Figure 3:
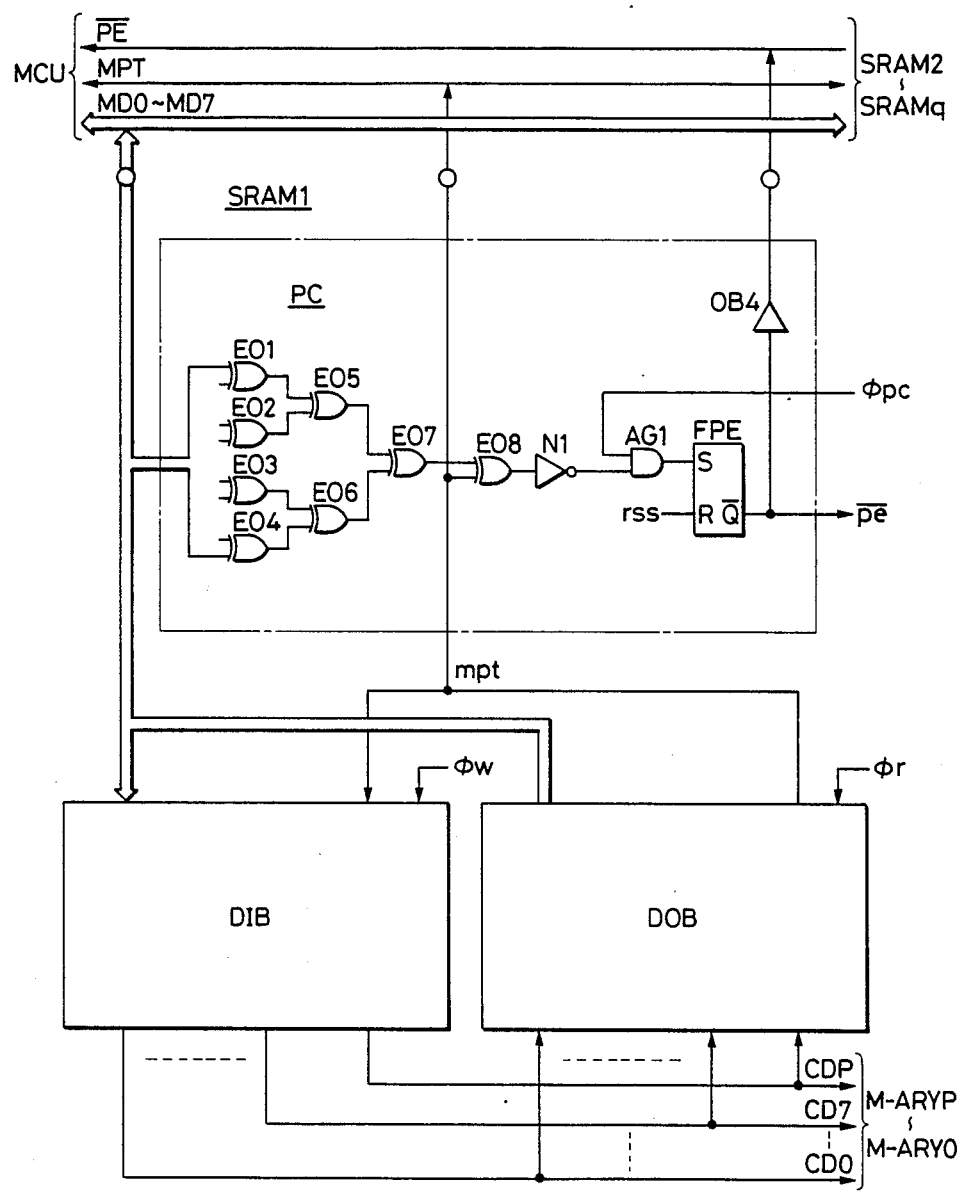
FIG. 3 is a circuit diagram of one example of the parity check circuit in the static type RAM shown in FIG. 2.

FIG. 3 is a circuit diagram of one example of the parity check circuit PC in the static type RAM shown in FIG. 2.

Referring to FIG. 3, the parity check circuit PC includes a parity check tree consisting of 8 exclusive OR (XOR) circuits EO1 to EO8, and a flip-flop FPE for displaying a parity error, although not necessarily limitative thereto.

One input terminal of the XOR circuit EO1 is connected to the internal data bus MD0 through a corresponding input circuit (not shown). The other input terminal of the XOR circuit EO1 is connected to the internal data bus MD1 through a corresponding input circuit (not shown). Similarly, the two input terminals of the XOR circuit EO2 are connected to the internal data buses MD2 and MD3 through corresponding input circuits (not shown), respectively. The two input terminals of the XOR circuit EO3 are connected to the internal data buses MD4 and MD5 through corresponding input circuits (not shown), respectively. Further, the two input terminals of the XOR circuit EO4 are connected to the internal data buses MD6 and MD7 through corresponding input circuits (not shown), respectively. Thus, the signal output from each of the XOR circuits EO1 to EO4 is shifted to a low level when both of two write or read data bits respectively transferred through the corresponding pair of internal data buses are at either a high or low level, whereas, when either one of the two bits is at the high level, the output signal is raised to a high level.

The signal output from the XOR circuit EO1 is supplied to one input terminal of the XOR circuit EO5. The other input terminal of the XR circuit EO5 is supplied with the signal output from the XOR circuit EO2. Thus, the signal output from the XOR circuit EO5 is shifted to a low level when both the signals output from the XOR circuits EO1 and EO2 are at either the high or low level, that is, when the number of "1" bits included in the 4-bit write or read data transferred through the internal data buses MD0 to MD3 is even. The output signal of the XR EO5 is raised to a high level when either one of the signals output from the XOR circuits EO1 and EO2 is at the high level, that is, when the number of "1" bits included in the 4-bit write or read data transferred through the internal data buses MD0 to MD3 is odd. Similarly, the signal output from the XOR circuit EO3 is supplied to one input terminal of the XOR circuit EO6. The other input terminal of the XOR circuit EO6 is supplied with the signal output from the XOR circuit EO4. Thus, the signal output from the XOR circuit EO6 is shifted to a low level when both the signals output from the XOR circuits EO3 and EO4 are at either a high or low level, that is, when the number of "1" bits included in the 4-bit write or read data transferred through the internal data buses MD3 to MD7 is even. The output signal of the XOR circuit EO6 is raised to a high level when either one of the signals output from the XOR circuits EO3 and EO4 is at the high level, that is, when the number of "1" bits included in the 4-bit write or read data transferred through the internal data buses MD4 to MD7 is odd.

The signal output from the XOR circuit EO5 is supplied to one input terminal of the XOR circuit EO7. The other input terminal of the XOR circuit EO7 is supplied with the signal output from the XR circuit EO6. Thus, the signal output from the XOR circuit EO7 is shifted to a low level when both the signals output from the XOR circuits EO5 and EO6 are at either a high or low level, that is, when the number of "1" bits included in the 8-bit write or read data transferred through the internal data buses MD0 to MD7 is even. The output signal of the XOR circuit EO7 is raised to a high level when either one of the signals output from the XOR circuits EO5 and EO6 is at the high level, that is, when the number of "1" bits included in the 8-bit write or read data transferred through the internal data buses ND0 to MD7 is odd.

The signal output from the XOR circuit EO7 is supplied to one input terminal of the XOR circuit EO8. The other input terminal of the XOR circuit EO8 is connected to the internal data bus MPT through a corresponding input circuit (not shown). Thus, the signal output from the XOR circuit EO8 is shifted to a low level when both the signal output from the XR circuit EO7 and the parity bit MPT are at either a high or low level, that is, when the number of "1" bits included in the 9-bits write or read data transferred through the internal data buses MD0 to MD7 and MPT is even. The output signal of the XOR circuit EO7 is raised to a high level when either the output signal of the XOR circuit EO7 or the parity bit MPT is at the high level, that is, when the number of "1" bits included in the 9-bit write or read data transferred through the internal data buses MD0 to MD7 and MPT is odd. In other words, when particular write or read data is normal, the output signal of the XOR circuit EO8 is at the high level, whereas, when the write or read data involves a parity error, the output signal of the XOR circuit EO8 is shifted to the low level.

The signal output from the XOR circuit EO8 is inverted in an inverter circuit N1 and then supplied to one input terminal of an AND gate circuit AG1. The other input terminal of the AND gate circuit AG1 is supplied with the above-described timing signal $\phi$pc from the timing control circuit TC. The signal output from the AND gate circuit AG1 is supplied to the set input terminal S of the flip-flop FPE. The reset input terminal R of the flip-flop FPE is supplied with a reset signal rss. This reset signal rss is temporarily raised to a high level when the static type RAM is brought into a non-select state and the chip enable signal $\overline{CEI}$ is returned to the high level. Thus, the flip-flop FPE is selectively set when the output signal of the AND gate circuit AG1 is raised to a high level, that is, when a parity error is detected in particular write or read data at the time the timing signal $\phi$pc is raised to the high level. The flip-flop FPE is reset when the chip enable signal $\overline{CEI}$ is raised to the high level and the reset rss is temporarily shifted to the high level.

The inverted output signal $\overline{Q}$ of the flip-flop FPE is supplied to the timing control circuit TC as the inverted internal parity error signal $\overline{pe}$ and also supplied to the memory control unit MCU as the parity error signal $\overline{PE}$ through the output buffer OB4.

Although, in the static type RAM in accordance with this embodiment, the parity error signal $\overline{PE}$ for outputting the result of parity check is specially provided and an external terminal therefor is provided, IIF it is difficult to add such an external terminal, the external terminal for the parity bit may also be used for the parity error signal $\overline{PE}$. More specifically, a tri-state type output buffer for relaying the parity bit to the internal data bus MPT is provided in the parity check circuit PC, and the output operation of this output buffer is controlled with the inverted internal parity error signal $\overline{pe}$. In this case, when the result of parity check is found to be normal, the level of the internal data bus MPT is high or low in accordance with the level of the parity bit. When a parity error is detected, the internal data bus MPT is brought into a high-impedance state. The control circuit CTL in the memory control unit MCU is provided with a circuit for making a judgement as to whether or not the internal data bus MPT is in a high-impedance state.

Figure 4:
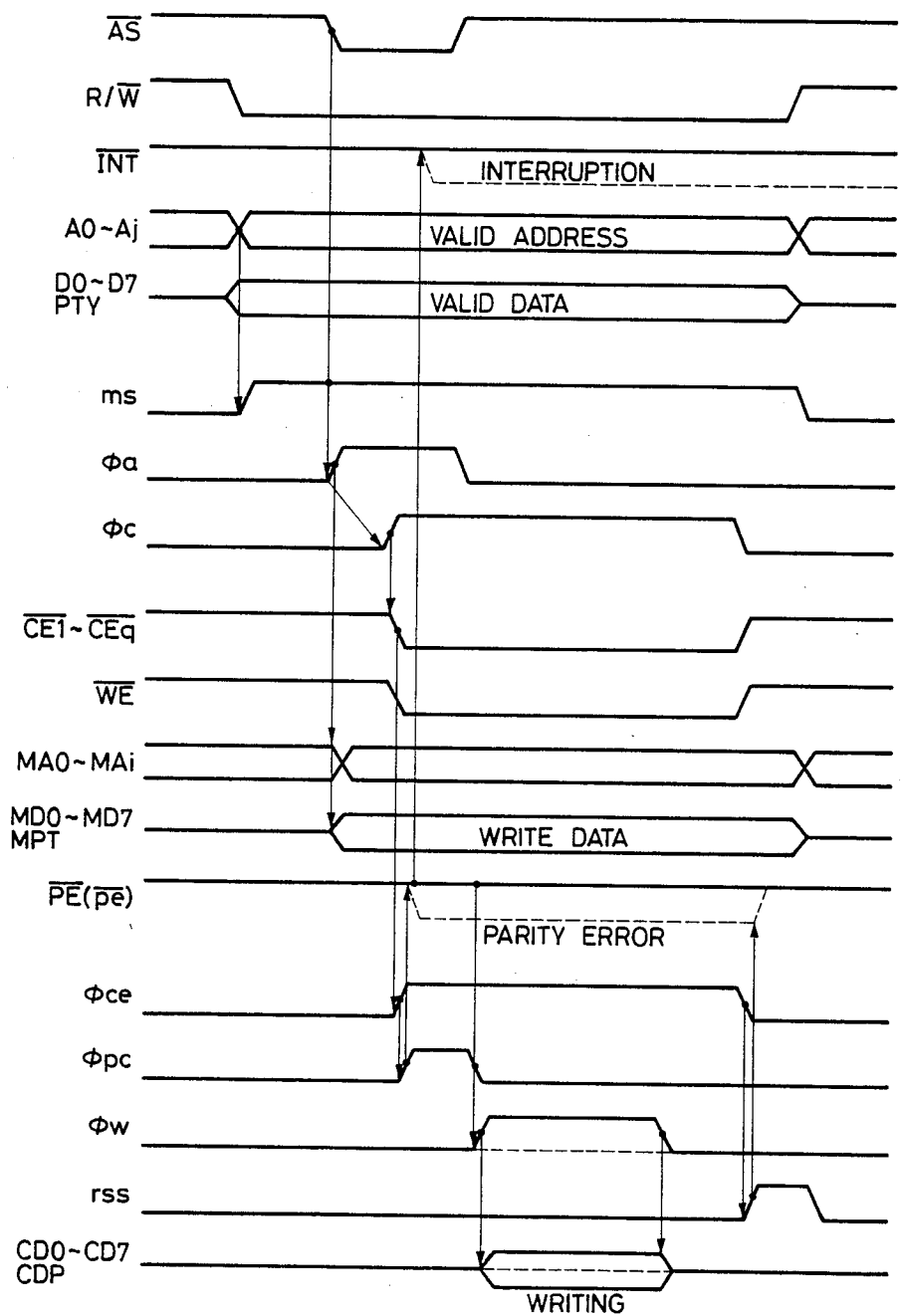
FIG. 4 is a timing chart showing one example of the write operation mode of the static type RAM shown in FIG. 2.

FIG. 4 is a timing chart showing one example of the write operation mode of the static type RAM shown in FIG. 2.

Referring to FIG. 4, first, the higher-order bits in the address signal A0 to Aj are combined together to specify a device code for the memory system and the read/write signal R/$\overline{W}$ is shifted to the low level. Thereafter, the address strobe signal $\overline{AS}$ is changed from the high level to the low level, thus causing the write operation mode of the memory system to be started.

In the memory control unit MCU, in response to the designation of a device code for the memory system, the signal output from the device code decoder DD, i.e., the memory select signal ms is raised to the high level. Further, when, in this state, the address strobe signal $\overline{AS}$ is shifted to the low level, the timing signal $\phi$a is temporarily raised to the high level, and the timing signal $\phi$c is then raised to the high level slightly after the rise of the timing signal $\phi$a.

In the memory control unit MCU, when the timing signal $\phi$a is temporarily shifted to the high level, the address signal supplied through the address buses A0 to Ai is fetched and held in the address buffer AB. When the timing signal $\phi$a is temporarily raised to the high level, the write data supplied through the data buses D0 to D7 and PTY is fetched and held in the data buffer DB. The fetched address signal and write data are supplied to the static type RAM through the internal address buses MA0 to MA7 and the internal data buses MD0 to MD7 and MPT, respectively.

Further, in the memory control unit MCU, when the timing signal $\phi$c is raised to the high level, the chip enable signals $\overline{CE1}$ to $\overline{CEq}$ are selectively shifted to the low level. Since the read/write signal R/$\overline{W}$ is shifted to the low level, the write enable signal $\overline{WE}$ is shifted to the low level simultaneously with the corresponding one of the chip enable signals $\overline{CE1}$ to $\overline{CEq}$.

In the static type RAM, in response to the shift of the write enable signal $\overline{WE}$ and the corresponding one of the chip enable signals $\overline{CE1}$ to $\overline{CEq}$ to the low level, the write operation mode is started. More specifically, the timing signal $\phi$ce is first raised to the high level by the operation of the timing control circuit TC in the static type RAM, and the timing signal $\phi$PC is then temporarily shifted to the high level. Slightly after the rise of the timing signal $\phi$pc, the timing signal $\phi$w is raised to the high level and maintained at said level for a predetermined period of time. In the parity check circuit PC, parity check is started at the time write data is supplied to the internal data buses MD0 to MD7 and MPT.

When the timing signal $\phi$ce is raised to the high level, both the X- and Y-address decoders XDCR and YDCR are activated to start the operation of selecting word and complementary data lines. At the time the timing signal $\phi$pc is raised to the high level, a judgement is made as to the result of parity check performed in the parity check circuit pc. When the result of parity check finds the write data to be normal. The parity error signal $\overline{PE}$ is left at the high level as shown by the solid line in FIG. 4. In consequence, the timing signal $\phi$w is raised to the high level at a predetermined timing, thus permitting execution of a write operation conducted by the data input buffer DIB. If a parity error is detected in the write data, the flip-flop FPE in the parity check circuit PC is set and the parity error signal $\overline{PE}$ is shifted to the low level as shown by the chain line in FIG. 4. In consequence, the interrupt request signal $\overline{INT}$ is delivered from the memory control unit MCU to the microprocessor MPU, and an interruption is thus started. Since the inverted internal parity error signal $\overline{pe}$ is shifted to the low level, the timing signal $\phi$w is left at the low level, so that a write operation by the data input buffer DIB is not executed.

When the corresponding one of the chip enable signals $\overline{CE1}$ to $\overline{CEq}$ is returned to the high level, the timing signal $\phi$ce is returned to the low level in the static type RAM. At the same time, the reset signal rss is temporarily raised to the high level. In consequence, the flip-flop FPE in the parity check circuit PC is reset, and the static type RAM is thus brought into a non-select state.

Figure 5:
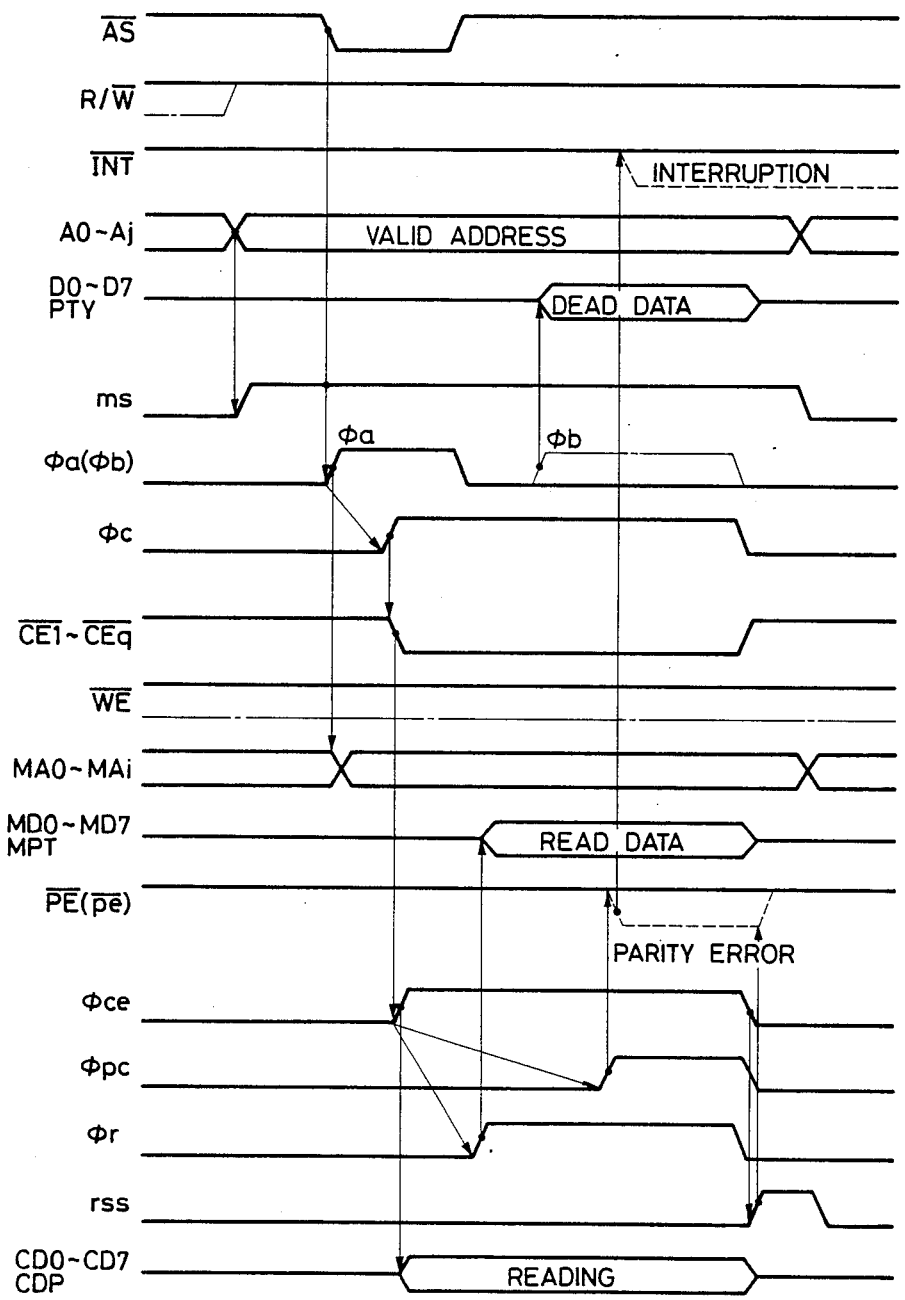
FIG. 5 is a timing chart showing one example of the read operation mode of the static type RAM shown in FIG. 2.

FIG. 5 is a timing chart showing one example of the read operation mode of the static type RAM shown in FIG. 2. Description of only a part of the read operation mode which is different from the write operation mode shown in FIG. 4 will be made below.

Referring to FIG. 5, first, the higher-order bits of the address signal A0 to Aj are combined together to specify the device code for the memory system in accordance with this embodiment, and the read/write signal R/$\overline{W}$ is raised to the high level. Thereafter, the address strobe signal $\overline{AS}$ is changed from the high level to the low level, thus causing the memory system to start a read operation. In the memory control unit MCU, the memory select output ms is first raised to the high level, and the timing signal $\phi a$ is temporarily shifted to the high level slightly after the rise of the memory select output ms. The timing signal $\phi a$ is sent to the address buffer AB but not supplied to the data buffer DB. Further, the timing signal $\phi c$ is raised to the high level slightly after the rise of the timing signal $\phi a$, and the timing signal $\phi b$ is raised to the high level and maintained at said level for a period of time which is substantially equal to the latter half of the period during which timing signal $\phi c$ is held at the high level. In response to the rise of the timing signal $\phi c$, one of the chip enable signals $\overline{CE1}$ to $\overline{CEq}$ is selectively shifted to the low level. Since the read/write signal R/$\overline{W}$ is at the high level, the write enable signal $\overline{WE}$ is left at the high level.

Since the write enable signal $\overline{WE}$ is at the high level and one of the chip enable signals $\overline{CE1}$ to $\overline{CEq}$ is shifted to the low level, the corresponding one static type RAM is selectively brought into a select state. In this static type RAM, the timing signal $\phi ce$ is first raised to the high level, and the timing signal $\phi r$ is then shifted to the high level slightly after the rise of the timing signal $\phi ce$. Further, the timing signal $\phi pc$ for parity check is raised to the high level and maintained at said level for the latter half of the period during which the timing signal $\phi r$ is held at the high level.

In the static type RAM, in response to the rise of the timing signal $\phi ce$, the X- and Y-address decoders XDCR and YDCR are activated to start their respective select operations. Thus, read signals in accordance with data stored in the selected memory cells are output to the corresponding common data lines CD0 to CD7 and CDP. At the time when the timing signal $\phi r$ is raised to the high level and the data output buffer DOB is thus activated, the read signals are amplified and transmitted to the corresponding internal data buses MD0 to MD7 and MPT, respectively.

At the time when the timing signal $\phi b$ is raised to the high level, the read data sent to the internal data basis MD0 to MD7 and MPT is fetched into the data buffer DB in the memory control unit MCU and further transferred to the microprocessor MPU through the data buses D0 to D7 and PTY.

The read data output from the selected memory cells is supplied to the parity check circuit PC in the static type RAM where it undergoes parity check. The result of the parity check is judged at the time the timing signal $\phi pc$ is raised to the high level. More specifically, when the read data is judged to be normal, the parity error signal $\overline{PE}$ is left at the high level as shown by the solid line in FIG. 5. In consequence, the read data is fetched from the memory control unit MCU into the microprocessor MPU through the data buses D0 to D7 and PTY, and a subsequent processing is started therein. If a parity error is detected in the read data, the flip-flop FPE in the parity check circuit PC is set at the time when the timing signal $\phi pc$ is raised to the high level, and the parity error signal $\overline{PE}$ is shifted to the low level. In consequence, the memory control unit MCU shifts the interrupt request signal $\overline{INT}$ to the low level to request the microprocessor MPU to execute an interruption. The flip-flop FPE in the parity check circuit PC is reset when the timing signal $\phi ce$ is shifted to the low level as the result of the return of the relevant one of the chip enable signals $\overline{CE1}$ to $\overline{CEq}$ to the high level and further the rest signal rss is temporarily raised to the high level. The interrupt request signal $\overline{INT}$ output from the memory control unit MCU is reset at the time an interruption is started by the microprocessor MPU.

As described above, each static type RAM in accordance with this embodiment is provided with the parity check circuit PC for performing parity check on write and read data. The result of the parity check is sent to the memory control unit MCU as the parity error signal $\overline{PE}$ and then transferred to the microprocessor MPU as the interrupt request signal $\overline{INT}$. When the parity error signal $\overline{PE}$ is detected, no writing timing signal $\phi w$ is formed in the static type RAM, thus preventing erroneous writing with abnormal write data. By virtue of these facts, the arrangement of the memory control unit MCU is simplified, and it is possible to identify a failing portion for each static type RAM. Accordingly, the diagnostic accuracy is improved, and the recovery time is shortened.

[Embodiment 2]

Figure 6:
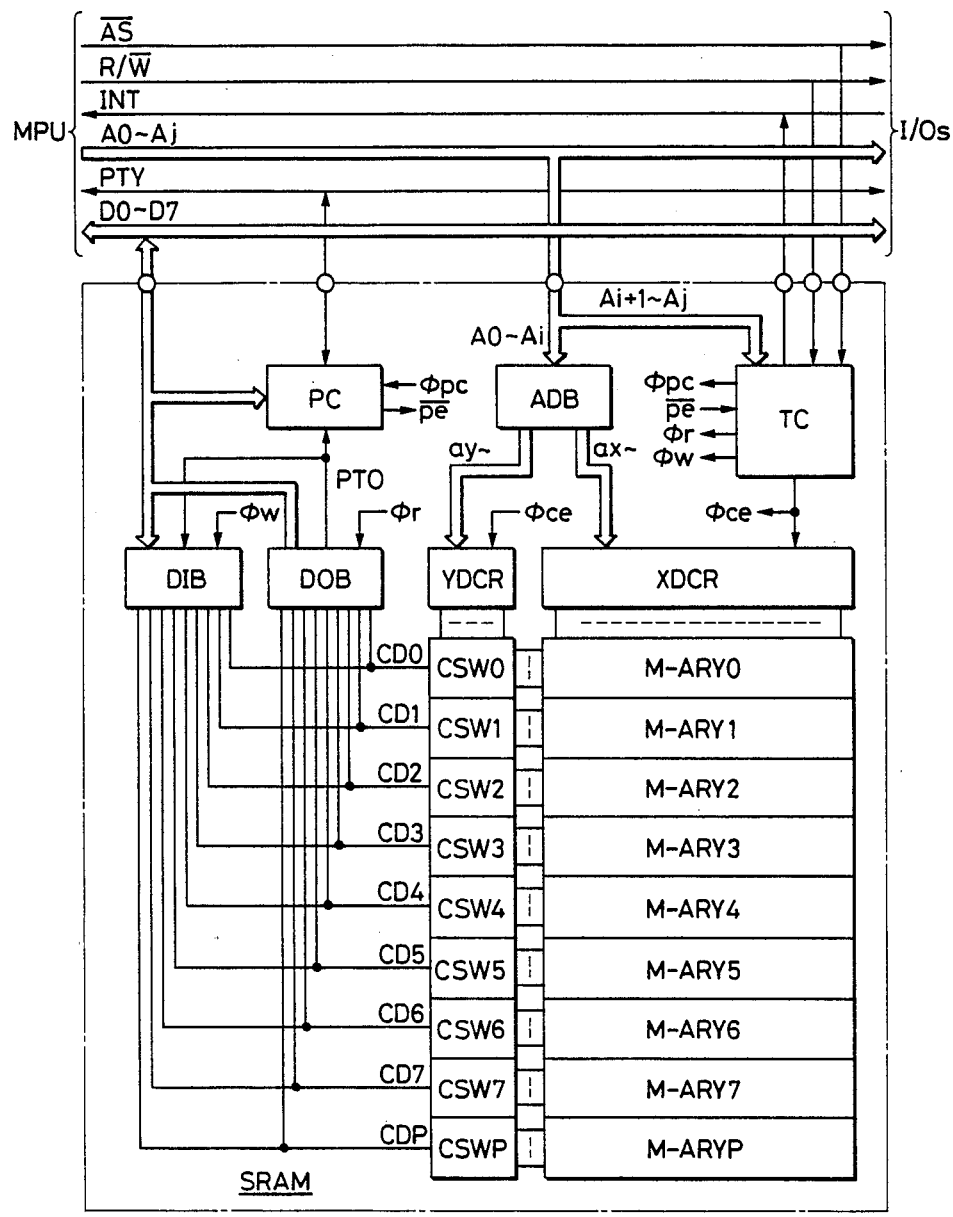
FIG. 6 is a block diagram of another embodiment of the static type RAM according to the present invention.

FIG. 6 is a block diagram of another embodiment of a static type RAM according to the present invention. The static type RAM in accordance with this embodiment has basically the same block arrangement as that of the static type RAM shown in FIG. 2. Description of only a part of the RAM according to this embodiment which is different from the RAM shown in FIG. 2 will be made below.

The static type RAM in accordance with this embodiment has a variety of bus control functions which are assigned to the memory control unit in the memory system shown in FIG. 1. Accordingly, the static type RAM in accordance with this embodiment is directly connected to the system buses. Further, a specific device code is given to the memory integrated circuit as an elementary unit and defined as an independent input/output device.

More specifically, as shown in FIG. 6, the address strobe signal $\overline{AS}$ and the read/write signal R/$\overline{W}$ which are output from the microprocessor MPU are directly input to the timing control circuit TC in the static type RAM. Among bits of the address signal which are supplied through the address buses A0 to Aj, the higher-order address signal bits Ai+1 to Aj are directly input to the timing control circuit TC in the static type RAM, while the lower-order address signal bits A0 to Ai are directly input to the address buffer ADB in the static type RAM. The data buses D0 to D7 are directly connected to the data input and output buffers DIB and DOB in the static type RAM. Among the bits constituting data, the parity bit PTY is passed through the parity check circuit PC in the static type RAM and transferred to the data input buffer DIB and the data output buffer DOB. The interrupt request signal $\overline{INT}$ is formed in the timing control circuit TC incorporated in the static type RAM. The timing control circuit TC is supplied with the inverted internal parity error signal pe which is formed in the parity check circuit PC in the same way as in the embodiment shown in FIG. 2.

In the static type RAM in accordance with this embodiment, the timing control circuit TC has the following bus control functions. Namely, the timing control circuit TC first monitors a device code specified by the higher-order bits Ai+1 to Aj of the address signal.

When the device code specifies this static type RAM and the address strobe signal $\overline{AS}$ is shifted to the low level, the timing control circuit TC activates this static type RAM to start. At this time, the operation mode of the static type RAM is determined in accordance with the level of the read/write signal R/$\overline{W}$.

Next, the timing control circuit TC, in response to the fall of the address strobe signal $\overline{AS}$ to the low level, raises the timing signals $\phi ce$, $\phi pc$ and $\phi w$ or $\phi r$ to the high level at predetermined timings to thereby control the operations of various portions of the static type RAM.

When the result of parity check performed by the parity check circuit PC is judged in response to the rise of the timing signal $\phi pc$, the timing control circuit TC selectively forms the interrupt request signal $\overline{INT}$ in accordance with the inverted internal parity error signal $\overline{pe}$ which is output from the parity check circuit PC. More specifically, when the inverted internal parity error signal $\overline{pe}$ is at the high level at the time of completion of parity check, the timing control circuit TC allows the internal operation of the static type RAM to be continued. At this time, the interrupt request signal $\overline{INT}$ is left at the high level. When, on the other hand, the inverted internal parity error signal $\overline{pe}$ is at the low level at the time of completion of parity check, the timing control circuit TC first shifts the interrupt request signal $\overline{INT}$ to the low level to request the microprocessor MPU to execute an interruption. If, at this time, the static type RAM is set in the write operation mode, no timing signal $\phi w$ is formed to prevent erroneous writing with abnormal input data.

As has been described above, the static type RAM in accordance with this embodiment is arranged so that the memory integrated circuit is an elementary unit which is defined as an independent input/output device, and the timing control circuit TC is provided with predetermined bus control functions. The static type RAM incorporates the parity check circuit in the same manner as in the embodiment shown in FIG. 2 for performing parity check on write and read data. When a parity error is detected, the interrupt request signal $\overline{INT}$ is shifted to the low level by the timing control circuit TC to request the microprocessor MPU to execute an interruption and, at the same time, a write operation is inhibited. Thus, employment of the static type RAM in accordance with this embodiment enables a memory system to be formed from a single static type RAM and further permits a diagnosis to be effectively made through parity check. Accordingly, it is possible to simplify the arrangement of the system and to improve the reliability thereof.

As exemplarily shown in the above-described two embodiments, the following advantageous effects can be obtained by applying the present invention to a semiconductor memory having a relatively large storage capacity, such as a static type RAM:

(1) It is possible to make an accurate diagnosis for each memory integrated circuit by incorporating a parity check circuit in a semiconductor memory such as a static type RAM for performing parity check on data input to or output from the semiconductor memory. Further, this enables a reduction in the recovery time of a system including the semiconductor memory.

(2) When a parity error is detected in input data during a write operation of the semiconductor memory, the write operation can be inhibited, which enables prevention of erroneous writing with abnormal input data.

(3) By virtue of the advantageous effects (1) and (2), it is possible to enhance the reliability of the memory system and hence a computer system or the like which includes this memory system.

(4) Incorporation of a parity check circuit into a semiconductor memory enables simplification of the arrangement of a memory system including a semiconductor memory having a relatively large storage capacity, and this permits a lowering in production cost of the system.

Although the invention accomplished by the present inventors has practically been described above by way of embodiments, it should be noted here that the present invention is not necessarily limitative to the described embodiments and various changes and modifications may, of course, be imparted thereto without departing from the gist of the invention. For example, in the embodiment shown in FIG. 1, the memory system may be connected to the internal buses of the microprocessor MPU or the like, and the combination of the control buses and the like are not limited to those in this embodiment.

In each of the embodiments shown in FIGS. 2 and 6, the parity check circuit PC may be provided for each of the input and output data, and the parity error signal $\overline{PE}$ may be provided for each static type RAM. In such a case, if the memory control unit MCU is provided with an error register corresponding to each static type RAM and this register is arranged so as to be read from the microprocessor MPU or the like, the diagnostic operation can be carried out even more effectively. Although in the embodiments shown in FIGS. 2 and 6, 9 memory arrays are provided in correspondence with 9 bits, respectively, of data which includes a parity bit, the arrangement may be such that a single memory array is employed and 9 pairs of complementary data lines are simultaneously brought into a select state to thereby realize 9 memory arrays equivalently. Further, each static type RAM may be accessed with data consisting of any desired number of bits other than 9, for example, 17 bits or 33 bits.

In the embodiment shown in FIG. 3, the parity check circuit PC may adopt the even parity check system, and the flip-flop FPE may be provided in the timing control circuit TC. Although the parity check tree is formed by combining together usual XOR circuits, it may be formed using dynamic type logic circuits which operate on similar logical conditions. Although in the described embodiments the external terminal and signal line for the parity error signal $\overline{PE}$ are provided independently, the internal data bus MPT for the parity bit may also be used therefor.

Further, it is possible to variously change in practice the block arrangements of the memory system and static type RAM's shown in FIGS. 1, 2 and 6, the practical circuit configuration of the parity check circuit PC shown in FIG. 3, and combination and timing conditions for various control signals, address signals and data shown in FIGS. 4 and 5.

Although the invention accomplished by the present inventors has mainly be described by way of one example in which the present invention is applied to a static type RAM which is an applicable field of the invention and on which the present invention is based, it is not necessarily limitative thereto and the invention may also be applied to various other types of semiconductor memory, for example, dynamic RAM's as described in U.S. Pat. No. 4,539,658 or U.S. Pat. No. 4,564,925. The present invention may widely be applied to semiconductor memories which are accessed with data consisting of, at least, a plurality of bits, and to digital devices incorporating such semiconductor memories.

What is claimed is:

1. A semiconductor memory comprising:
   a memory array which outputs storage data, at least one data unit at a time, each data unit having a plurality of bits including a parity bit;
   a first parity check circuit for performing parity check on storage data, at least one data unit at a time, output from said memory array;
   an external terminal means for outputting the result of said parity check; and
   a second parity check circuit for performing parity check on input data, at least one data unit at a time, written into said memory array, each of said input data units having a plurality of bits including a parity bit, wherein said first parity check circuit is also used as said second parity check circuit;
   means for inhibiting an operation of writing said input data with respect to said memory array when a parity error is generated;
   wherein said semiconductor memory is a static type RAM formed on one chip, and wherein said parity bit is added from a device which is provided outside said semiconductor memory; and
   wherein said external terminal means for outputting the result of said parity check includes means for inputting/outputting said parity bit, and the level of said external terminal means is changed to either a low or high level in accordance with the level of said parity bit when the result of said parity check is found to be normal, whereas, when a parity error is detected, the level of said external terminal is brought into a high-impedance state.

2. A semiconductor memory formed on one chip comprising:
   parity check means for performing parity check based on data comprised of a plurality of bits and parity information comprised of at least one bit;
   memory means coupled to said parity check means;
   first external terminal means coupled to said parity check means and said memory means; and
   writing means for controlling a writing operation of said memory means based on an output signal of said parity check means,
   wherein said parity check means performs a parity check based on said data and said parity information supplied from said external terminal means within a period of a write operation mode of said semiconductor memory and a parity check based on said data and said parity information read from said memory means within a period of a read operation mode of said semiconductor memory, and wherein said writing means inhibits said writing operation of said memory means when said output signal of said parity check means indicates a parity error.

3. A semiconductor memory according to claim 2, further comprising second external terminal means coupled to said parity check means for delivering said output signal of said parity check means outside of said semiconductor memory.

4. A semiconductor memory according to claim 3, further comprising output means for transmitting said data and said parity information read from said memory means to said first external terminal means.

5. A semiconductor memory according to claim 4, wherein said writing means include input means for controlling transmission of said data and said parity information supplied from said first external terminal means to said memory.

6. A semiconductor memory according to claim 5, wherein said input means inhibits said transmission of said data and said parity information when said output signal of said parity check means indicates a parity error.

7. A semiconductor memory according to claim 6, said memory means is a static type RAM.

8. A microcomputer system comprising:
   a microprocessor;
   a semiconductor memory formed on one chip; and
   bus means coupled to said microprocessor and said semiconductor memory, wherein said semiconductor memory comprises:
   parity check means for performing parity check based on data comprised of a plurality of bits and parity information comprised of at least one bit;
   memory means coupled to said parity check means;
   first external terminal means coupled to said bus means, said parity check means and said memory means; and
   writing means for controlling a writing operation of said memory means based on an output signal of said parity check means,
   wherein said parity check means performs a parity check based on said data and said parity information supplied from said external terminal means within a period of a write operation mode of said semiconductor memory and a parity check based on said data and said parity information read from said memory means within a period of a read operation mode of said semiconductor memory, and wherein said writing means inhibits said writing operation of said memory means when said output signal of said parity check means indicates a parity error.

9. A semiconductor memory according to claim 8, further comprising a second external terminal means coupled to said bus means and said parity check means for delivering said output signal of said parity check means to said microprocessor.

10. A semiconductor memory according to claim 9, further comprising output means for transmitting said data and said parity information read from said memory means to said first external terminal means.

11. A semiconductor memory according to claim 10, wherein said writing means includes input means for controlling transmission of said data and said parity information supplied from said first external terminal means to said memory.

12. A semiconductor memory according to claim 11, wherein said input means inhibits said transmission of said data and said parity information when said output signal indicates a parity error.

13. A semiconductor memory according to claim 12, said memory means is a static type RAM.

* * * * *